(12) United States Patent
Köhler

(10) Patent No.: US 11,708,178 B2
(45) Date of Patent: Jul. 25, 2023

(54) MONITORING SYSTEM FOR AN ASSEMBLY HAVING A KINEMATIC COUPLING

(71) Applicant: Airbus Defence and Space GmbH, Taufkirchen (DE)

(72) Inventor: Thomas Köhler, Taufkirchen (DE)

(73) Assignee: Airbus Defence and Space GmbH

( * ) Notice: Subject to any disclaimer, the term of this patent is extended or adjusted under 35 U.S.C. 154(b) by 292 days.

(21) Appl. No.: 17/119,289

(22) Filed: Dec. 11, 2020

(65) Prior Publication Data

US 2021/0179297 A1 Jun. 17, 2021

(30) Foreign Application Priority Data

Dec. 12, 2019 (DE) ...................... 10 2019 134 215.5

(51) Int. Cl.
*B64F 5/60* (2017.01)
*B64C 13/18* (2006.01)
*G01B 21/22* (2006.01)

(52) U.S. Cl.
CPC ................ *B64F 5/60* (2017.01); *B64C 13/18* (2013.01); *G01B 21/22* (2013.01)

(58) Field of Classification Search
CPC ........... B64F 5/60; B64C 13/18; B64C 13/28; B64D 2045/0085; B64D 45/0005; G01B 21/22
See application file for complete search history.

(56) References Cited

U.S. PATENT DOCUMENTS

| 8,864,101 | B1* | 10/2014 | Buckner | E03B 7/08 |
| | | | | 251/59 |
| 2013/0026287 | A1* | 1/2013 | Goupil | B64D 45/0005 |
| | | | | 244/99.9 |
| 2018/0029690 | A1* | 2/2018 | Hagerott | B64D 45/0005 |
| 2018/0334245 | A1* | 11/2018 | Grohmann | B64C 13/46 |
| 2019/0144135 | A1* | 5/2019 | Mansouri | F16D 66/021 |
| | | | | 701/3 |

FOREIGN PATENT DOCUMENTS

EP 3012192 A1 4/2016

OTHER PUBLICATIONS

Extended European Search Report for Application No. 20212918.5 dated May 6, 2021, pp. 1-4.

* cited by examiner

*Primary Examiner* — Mussa A Shaawat
(74) *Attorney, Agent, or Firm* — Lerner David LLP

(57) ABSTRACT

A monitoring system for monitoring a kinematic coupling between an actuator and an element controlled by the latter includes a first sensor to detect the operative movement of the actuator. A second sensor is designed to detect the actual movement of the controlled element. A computer unit, based on the operative movement of the actuator, determines an anticipated movement of the controlled element and compares this anticipated movement with the actual movement of the controlled element. An error message is emitted when a value of the deviation between the anticipated movement and the actual movement exceeds a predefined threshold value.

10 Claims, 2 Drawing Sheets

MONITORING SYSTEM FOR AN ASSEMBLY HAVING A KINEMATIC COUPLING

FIELD OF THE INVENTION

The description relates to a system for monitoring the quality of a kinematic coupling between an actuator and an element controlled by the actuator. The description thus generally relates to a monitoring system for a kinematic coupling. The description moreover relates to safety-relevant systems having such a monitoring system, in particular to an aircraft having a monitoring system.

BACKGROUND OF THE INVENTION

Kinematic couplings are used in a multiplicity of technical systems in order for movement to be transmitted from an input side to an output side. An actuator or a drive is typically disposed at the input side, whereas a controlled or moved element is disposed at the output side. The actuator generates a movement, and a kinematic coupling transmits this movement to the controlled element.

In almost all systems in which a movement takes place, wear to a lesser or greater extent appears over the service life of these systems. Such wear typically occurs in the kinematic coupling. However, the wear can also affect the actuator or the controlled element.

In any case, wear at each of the mentioned locations can lead to a movement of the actuator at the input side no longer correlating directly with a movement of the controlled element at the output side, or to the controlled element under the effect of external forces on the controlled element moving without the actuator at the input side moving. In this state of the system, which is composed of the actuator, the kinematic coupling and the controlled element, it can be said that said system has play.

Complex or safety-relevant systems are subjected to checks and maintenance at regular time intervals in order for play in a system to be identified. In this case, the systems or sub-systems prone to play are examined and readjusted if necessary in order for the play to be removed from the system.

BRIEF SUMMARY OF THE INVENTION

An aspect of the invention may relate to improving the monitoring of safety-relevant systems which contain a kinematic coupling.

According to one aspect, a monitoring system for monitoring a kinematic coupling between an actuator and a controlled element is specified. The monitoring system has a first sensor, a second sensor, and a computer unit. The first sensor is disposed such that said first sensor detects an operative movement of the actuator and, based on the detected operative movement of the actuator, provides a first signal. The second sensor is disposed such that said second sensor detects a movement of the controlled element and, based on the detected movement of the controlled element, provides a second signal. The computer unit is connected to the first sensor and the second sensor and is designed to receive the first signal and the second signal. The computer unit, based on the first signal, is furthermore designed to determine an anticipated movement of the controlled element and to compare the anticipated movement with the detected movement corresponding to the second signal and to provide a deviation between the anticipated movement and the detected movement.

The monitoring system described herein serves for monitoring a kinematic system and the movement of the component parts of this kinematic system. A kinematic system is typically composed of a drive (actuator), a kinematic coupling, and a controlled element. The kinematic coupling is connected to the actuator and the controlled element such that a movement of the actuator is transmitted to the controlled element. The movement of the actuator by way of the kinematic coupling can be transmitted with or without gearing to the controlled element. The actuator at the input side can be connected to the kinematic coupling by means of rods, levers and articulations or hinges, for example, so as to transmit forces, for example tensile forces and/or compressive forces, to the kinematic coupling. The kinematic coupling at the output side is likewise connected to the controlled element by means of rods, levers and articulations or hinges for example, so as to transmit forces, for example tensile forces and/or compressive forces, to the controlled element.

The kinematic coupling can transmit a translatory or rotary movement from the actuator to the controlled element. To this end, the kinematic coupling can have various elements, specifically rods, levers, articulations, cables, rollers, gear wheels, or the like, in order for the transmission of the movement to be implemented.

The monitoring system described herein can advantageously be used where a movement of the actuator has to correlate to a very high degree and with great precision with a movement of the controlled element, and where play resulting from one of the component parts of the kinematic system is highly undesirable. Depending on the design embodiment of the actuator, play in the actuator per se can be very substantially reduced or even eliminated. For example, hydraulic actuators are thus distinguished by being scarcely or not at all prone to play. Likewise, the controlled element can be designed such that play is reduced or almost eliminated. It is thus substantially the kinematic coupling that remains as the main source for play in a kinematic system. The monitoring system described herein is suitable for identifying play in a kinematic system independently of where this play is introduced into the system.

The monitoring system is based on the movement of the controlled element being additionally and separately detected by the second sensor. This actual movement, or detected movement, of the controlled element is compared with an anticipated movement of the controlled element, wherein the anticipated movement of the controlled element is determined based on the movement of the actuator. In other words, the movement of the controlled element is thus determined in two ways: once as an anticipated movement based on the movement of the actuator, and additionally as a direct detection of the actual movement of said controlled element by means of the second sensor.

The computer unit utilizes an initial position and/or a positional variation of an actuating element of the actuator in order for the anticipated movement of the controlled element to be determined. The actuating element of the actuator represents the interface between the actuator and the kinematic coupling and can be designed, for example, as a rod for transmitting tensile forces and compressive forces, or as a cable for transmitting tensile forces.

The first sensor is disposed on the actuator, or on the actuating element of the actuator, or in the environment of the actuator so as to determine a movement transmitted to the kinematic coupling and to convert said movement into a measurement signal, that is to say the first signal. The first signal accordingly indicates a position, or a variation of the position, of the actuating element of the actuator.

The second sensor is coupled to the controlled element, or to an environment of the controlled element, such that the movement of the controlled element can be detected. It also applies to the second sensor that the detected movement is converted to a measurement signal, wherein this measurement signal is referred to as the second signal. The second sensor can be disposed on the controlled element, for example. When the controlled element moves, the second sensor, by virtue of the varied position or orientation thereof in terms of the environment, can detect this movement. The second sensor can likewise be disposed at a point in the environment of the controlled element such that the controlled element moves in relation to the second sensor. In any case, the second signal serves for indicating the actual movement of the controlled element.

Deviations between an anticipated and a detected movement arise in particular when a system component such as, for example, the kinematic coupling has mechanical play. When the kinematic coupling has play it is likewise possible that the controlled element moves under the influence of external forces, without this movement being predefined or initiated by the actuator. This case also represents a deviation between an anticipated and detected movement. The deviation can be determined as a difference between the two signals. The anticipated movement is zero because the actuator has not predefined any movement, whereas the detected movement represents an actual movement of the controlled element.

The actuator can be a hydraulic element, a mechanical drive, or an electro-mechanical drive. The actuator is designed, for example, to receive a command signal and to generate an operative movement corresponding to the command signal. With the proviso that there is a direct correlation between the command signal and the operative movement, it is also conceivable that the command signal is used for the comparison with the detected movement of the controlled element.

One concept of the monitoring system described herein is that the monitored system is subjected to permanent monitoring during its operating time. Permanent monitoring here means that the anticipated movement of the controlled element emanating from the operative movement of the actuator is repeatedly compared with the actual movement of the controlled element at regular or irregular temporal intervals, and a corresponding message is provided in the case of deviations (difference between an anticipated and an actual movement, or between the corresponding signals, respectively). This is helpful in particular in the case of safety-critical applications, because the play in a kinematic system is monitored not only at the provided maintenance intervals but permanently. This can be particularly helpful where play by virtue of high external forces can lead to rapid and intense wear of the system to the point of destruction of the latter.

In one embodiment, the computer unit is designed to compare the deviation between the anticipated movement and the detected movement with a threshold value and to emit an error message when the deviation reaches or exceeds the threshold value.

The value of the deviation between the anticipated movement and the detected movement is in particular compared with the threshold value. The information pertaining to an existing deviation alone is typically sufficient, whereas the direction of the deviation (positive or negative) is initially irrelevant. The deviation can then be examined in more detail in subsequent measuring and checking steps.

The threshold value for the deviation can be indicated as an angle in the case of a pivoting movement of the controlled element. This threshold value can be very low, for example a few millirad (mrad), in safety-critical environments. However, it is likewise conceivable that the threshold value is defined as an absolute deflection (millimetres or centimetres) by which the actual movement deviates from the anticipated movement at a point of the controlled element.

In one further embodiment, the computer unit, based on a model of the kinematic coupling, is designed to determine the anticipated movement of the controlled element.

For example, the monitoring system, based on movements of actuators, can be used in an airplane in order to check or monitor, respectively, the movement of control surfaces. A model of the airplane is present that is utilized by a controller or the computer unit for computing the response of controlled elements to an input (that is to say the command signal transmitted to the actuator). For example, if an actuator which functions as an actuator of a control surface is activated, using the model of the airplane it can thus be computed how the control surface responds to an input to the actuator. This computation corresponds to the anticipated movement of the controlled element, that is to say the control surface. The model here can relate to the kinematic coupling between the actuator and the controlled element but may also be a model of a superordinate assembly which contains the actuator, the controlled element, and the kinematic coupling between the actuator and the controlled element.

In one further embodiment, the first sensor as well as the second sensor are sensors selected from the group comprising: a movement sensor, an angular rate sensor, a rotational position sensor, an angle sensor, a linear variable differential transformer, an optical sensor, a mechanical sensor having moving parts, a magnetic sensor, a Hall effect sensor.

Overall, any sensor which is suitable and designed for detecting a translatory or rotary movement of the actuating element of the actuator and/or of the controlled element and for generating and providing a signal corresponding to the detected movement can be used.

In one further embodiment, the second sensor is designed to detect the movement of the controlled element at a scanning rate of more than 1 kHz.

The monitoring system in this embodiment is thus conceived for detecting rapid and high-frequency movements and/or vibrations of the controlled element, such movements arising, for example, when a control surface in an airplane oscillates or vibrates under the influence of the air current acting thereon and when the kinematics moving the control surface or holding the latter in position has play. The second sensor as well as the computer unit have to be conceived so as to be able to perform the scanning rate of several kHz (1 kHz up to several 10 kHz) and process the data accumulating on account thereof.

In one further embodiment, the computer unit is designed to supply the second signal to a filter and to use the filtered signal for the comparison with the first signal.

Peaks relating to load and movement, which result from a high external force which is greatly limited in time but are not attributable to play in the kinematics, can thus be filtered out from the second signal. In the case of very high external forces, a movement of the controlled element can take place simply by virtue of elastic deformation even in the absence of movement of the actuator.

For example, a low-pass filter, a Kalman filter, a Wiener filter, or a correlation algorithm can be used as a filter. Such a filter is preferably designed as a digital filter algorithm and can be implemented as a separate filter module in the computer unit.

According to a further aspect, an aircraft which has a monitoring system according to one or a plurality of embodiments of the monitoring system described herein is specified.

The monitoring system can in particular be used in safety-relevant environments. This can be aircraft. However, other fields of application with high safety requirements and associated requirements in terms of the accuracy and the functioning of the kinematic coupling between an actuator and an element controlled by the latter are also possible.

For example, the monitoring system can be used in industrial plants or watercraft. The monitoring system in industrial plants can be used in conjunction with locks or valves, for example, the anticipated opening of said locks or valves being compared with the actual opening. In the context of watercraft, the monitoring system can be used in a manner similar to aircraft, specifically for monitoring moving elements which are exposed to the water current (or the air current) and can be moved by an actuator.

In the case of aircraft, this can be airplanes, helicopters, or drones. The monitoring system can in particular be used for comparing an anticipated movement of an element exposed to the air current with an actual movement of this element.

In one embodiment of the aircraft, the controlled element is a control surface of the aircraft and the actuator is an actuator connected to the control surface by way of a kinematic coupling.

The actuator can be a hydraulic, mechanical, or electromechanical element which is capable of carrying out a movement in order for said movement to be able to be transmitted to the control surface by way of the kinematics and for said movement to cause a movement of the control surface.

The control surface can be, for example, a rudder or a flap of an airplane, for example a horizontal rudder, an aileron, a vertical rudder, a canard, a trim tab which is assigned to one of these rudders, or else a landing flap. The monitoring system can generally be used for monitoring any moving elements in an aircraft (and/or other safety-relevant systems) and for comparing the actual movement of said elements with the required movement (that is to say the nominal movement which under normal circumstances corresponds to the movement of the actuator), and to emit a message in the case of any deviation.

In a further embodiment of the aircraft, the second sensor is disposed so as to detect a relative movement between the control surface and the fuselage or any other component of the aircraft that is connected to the fuselage.

When the control surface is a rudder, the relative movement between the rudder and the wing (aileron or landing flap relative to the wing, horizontal rudder relative to the tailplane, vertical rudder relative to the vertical stabilizer) is detected. When the control surface is a trim tab attached to a rudder, the relative movement between the trim tab and the associated rudder can in particular be detected.

In this embodiment, the second sensor is in particular designed to detect a pivoting movement of the control surface. The second sensor is designed, for example, as an angle sensor which detects a pivoting movement about an articulation of the control surface, or as a deflection sensor which detects an absolute deflection of the control surface.

The second sensor is attached such that said second sensor can detect a movement of the control surface relative to the environment of the latter (fuselage, fin, wing), or in an articulation by way of which the control surface is attached to the environment of the latter.

In a further embodiment of the aircraft, the computer unit implements functions of the flight controls for the aircraft.

The computer unit in one example can be a computer which carries out functions of controlling the aircraft. This computer can in turn carry out the functionality of the computer unit described herein. Moreover, the computer can also assume other functions of controlling the aircraft. Alternatively, it is also possible for the functions of the computer unit to be physically separated from the other functions of controlling the aircraft, that is to carry out said functions on two mutually separate computers. This alternative has the advantage that the monitoring system can be retrofitted in an existing aircraft without any interventions in the existing systems. It is only the existing control signal to the actuator, or the measured value of the sensor assigned to the actuator, respectively, that has to be tapped into.

In other words, the monitoring system described herein carries out a task which is usually carried out by a dedicated testing apparatus at predefined maintenance intervals on the ground, is in some cases moved into an aircraft and carried out in the aircraft during the operation of the latter, that is to say in the air. The monitoring system continually compares the anticipated movement of a control surface with the actual movement of this control surface, and, in the case of a deviation that exceeds a threshold value, is capable of emitting an indication pertaining to this deviation. The aircraft can then be subjected to detailed checking.

BRIEF DESCRIPTION OF THE DRAWINGS

Exemplary embodiments of the invention will be discussed in more detail hereunder by means of the appended drawings. The illustrations are schematic and not to scale. The same reference signs refer to identical or similar elements. In the drawings.

DETAILED DESCRIPTION

Figure 1:
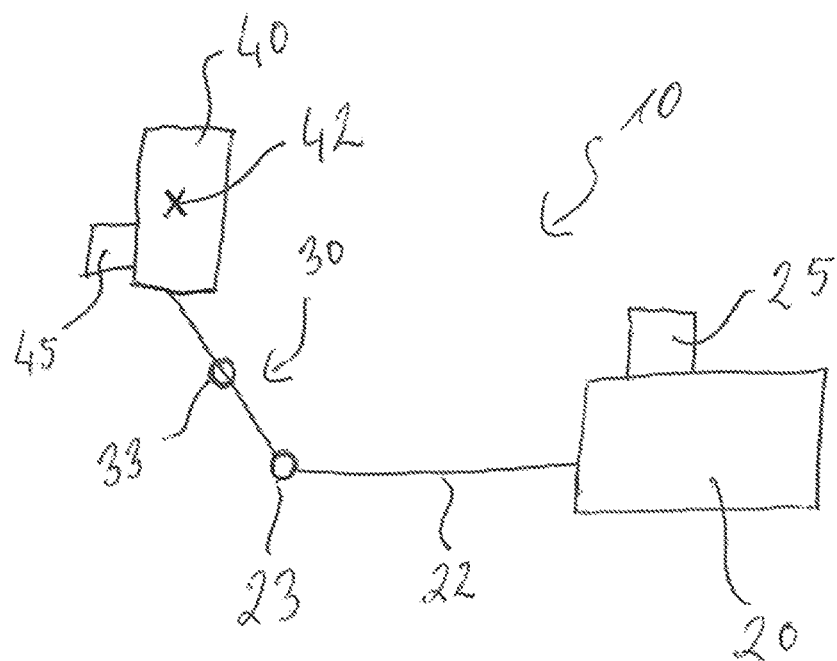
FIG. 1 shows a schematic illustration of a kinematic system having a first sensor and a second sensor.

FIG. 1 shows a monitoring system 10 for a kinematic system. The kinematic system is composed of an actuator 20, a kinematic coupling 30, and a controlled element 40. The actuator 20, by way of an actuating element 22, is connected to the kinematic coupling 30 by way of an articulation 23. Operative movements of the actuator 20 can thus be transmitted to the kinematic coupling 30 by way of the actuating element 22. The actuator 20 and the connection thereof to the kinematic coupling 30 represents the input side of the kinematic system.

The kinematic coupling 30 can be composed of a multiplicity of moving mechanical elements which are coupled to one another, for example levers, articulations, rods, cables, rollers, gear wheels, and the like. In any case, the kinematic coupling 30 having a lever which is fastened to an articulation or fulcrum 33, respectively, and mounted so as to be rotatable about this fulcrum 33, is illustrated in a simplified manner in FIG. 1.

In the example shown in FIG. 1, the kinematic coupling 30 is connected directly to the controlled element 40. A movement which is transmitted by way of the kinematic coupling 30 thus has an effect on the controlled element 40. The controlled element 40 and the connection thereof to the kinematic coupling 30 represents the output side of the kinematic system.

In the example shown in FIG. 1, the actuator 20 by way of the actuating element 22 can deliver a translatory movement to the kinematic coupling (to the right or the left in FIG. 1). The lever of the kinematic coupling pivots about the fulcrum 33. This pivoting movement is in turn delivered to the controlled element 40 and can move the controlled element 40 in a translatory or rotary manner, for example in that a rotary movement about the fulcrum 42 is caused.

Kinematic systems can be used in highly sensitive or highly precise systems, for example aircraft. As described further above, the actuation of control surfaces of an aircraft represents a kinematic system.

The input side of the kinematic system is operatively connected to the output side of the kinematic system. This means that any effect introduced at the input side affects the output side. There is a tight correlation between the effect (movement) introduced at the input side and the effect (movement) taking place at the output side: (1) an effect introduced at the input side leads to a predictable effect at the output side, and (2) there is likewise no effect at the output side without an effect introduced at the output side, that is to say that the output side maintains an existing position. Play in the kinematic system leads to this correlation no longer being present in this manner. In the case of play, it can no longer be predicted how the effect at the output side will be in the case of an specific effect introduced at the input side, and it can arise that the controlled element moves even when the actuator at the input side does not carry out any movement.

In order for the play in such an undesirable state to be identified, it is provided that a first sensor 25 is disposed on or close to the actuator 20 so as to detect an operative movement of the actuator 20 at the input side, and a second sensor 45 is disposed on or close to the controlled element 40 so as to detect an actual movement of the controlled element 40.

In a representative manner for the signal of the first sensor 25, it is conceivable that a command signal which is transmitted to the actuator 20 is used for the operative movement of the actuator 20. It can however be advantageous for the operative movement of the actuator 20 to be detected directly by the first sensor 25. The monitoring system as described herein is firstly conceived for monitoring a correlation, or a proportionality, respectively, between the movements of the input side and the output side of the system, wherein this refers to the actual movements and not necessarily to the movement which at the input side is directed by way of the command signals.

The signals emitted by the first sensor 25 and the second sensor 45 are resorted to in order to determine and compare with one another the anticipated movement of the controlled element, based on the signal of the first sensor 25, and the actual movement, based on the signal of the second sensor 45. This function is carried out by a computer unit 60 (see FIG. 3).

Figure 2:
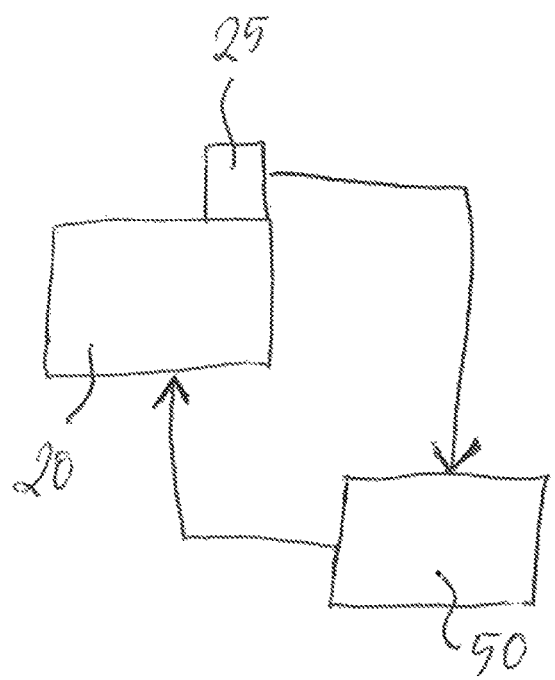
FIG. 2 shows a schematic illustration of a controller and an actuator controlled by the former, having a first sensor.

FIG. 2 shows in an exemplary manner how the actuator 20 at the input side of the kinematic system is controlled and monitored by a controller 50. The controller 50 in an aircraft can also be referred to as a flight control computer. The controller 50 delivers a command signal to the actuator 20, and the first sensor 25 measures an operative movement of the actuator 20 that has taken place. This operative movement of the actuator 20 that is measured by the first sensor 25 is converted to a first signal and transmitted to the controller 50 by the first sensor. The controller 50 then, based on a model, utilizes the first signal so as to determine a state of the kinematic system (for example of a control surface of the aircraft). This state is determined by the controller 50 as a fundamental for controlling the aircraft.

Figure 3:
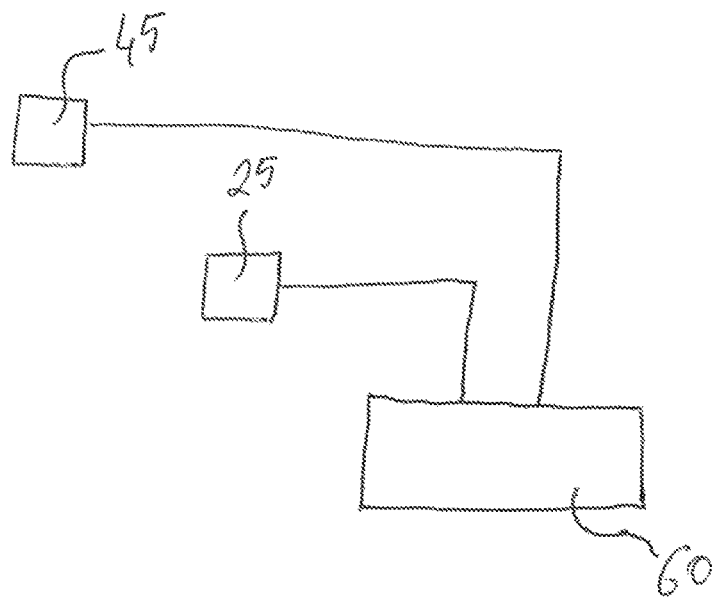
FIG. 3 shows a schematic illustration of a computer unit which is connected to a first sensor and a second sensor.

In addition to the kinematic system shown in FIG. 1, FIG. 3 shows fragments of a connection of the two sensors 25, 45 to the computer unit 60. The computer unit 60, in addition to the controller 50 from FIG. 2, receives the signals from the first sensor 25 and the second sensor 45. The computer unit, based on the first signal of the first sensor 25, determines an anticipated operative movement at the output side, and compares this anticipated operative movement at the output side with the actual operative movement at the output side that is communicated by way of a second signal by the second sensor 45.

The computer unit 60 can determine the anticipated operative movement at the output side independently of the controller 50. However, it is likewise conceivable for the computer unit 60 to be communicatively connected to the controller 50 and to receive the anticipated operative movement at the output side from the controller 50, because the controller 50 in any case determines the anticipated operative movement at the output side for the purposes of fly control.

If the computer unit 60 establishes that there is a deviation between the anticipated operative movement and the actual operative movement that exceeds a threshold value, a message which points toward this inconsistency, or toward this play, respectively, in the kinematic system is emitted.

Figure 4:
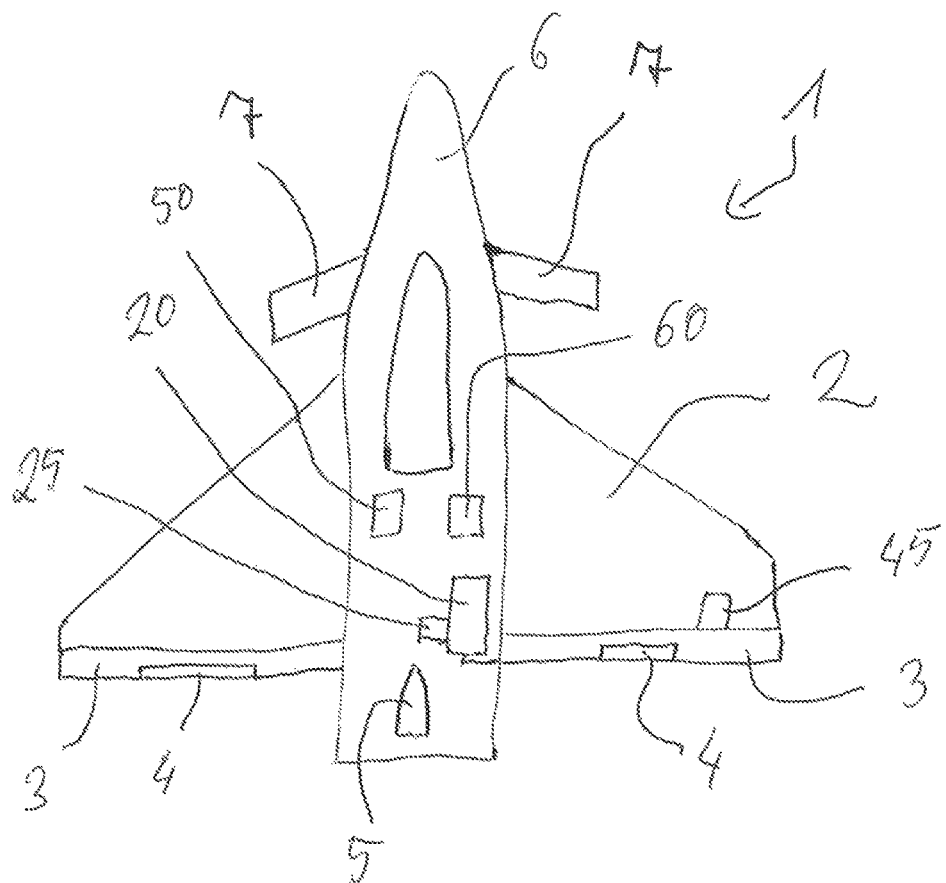
FIG. 4 shows a schematic illustration of an aircraft having a monitoring system for the movement of a control surface.

FIG. 4 shows in an exemplary manner an aircraft 1 which is equipped with a monitoring system as has been described with reference to FIG. 1 to FIG. 3.

The aircraft 1 in the form of an airplane has a fuselage 6 on which wings 2, a tailplane 7, and a vertical stabilizer 5 are disposed. The tailplane 7 in the example of FIG. 4 is disposed ahead of the wings 2. Of course, the tailplane 7 may also be disposed behind the wings 2. The tailplane 7 can have a horizontal stabilizer and a movable horizontal rudder. It is to be noted that the principles described with reference to FIG. 4 can be applied to all actuated surfaces (for example, the horizontal rudder, the vertical rudder, the aileron) on an aircraft, in particular an airplane. For reasons of clarity, no rudders are plotted on the vertical stabilizer 5 and the horizontal stabilizer 7 but may of course be present.

One rudder 3 having a flap 4 is in each case disposed on the wings 2. An actuator 20 is disposed in the airplane and is connected to a rudder 3 by way of a kinematic assembly (not illustrated for the sake of clarity in FIG. 4) so as to move the rudder 3 in relation to the wing 2. A first sensor 25 for detecting an operative movement of the actuator 20 is disposed on the actuator 20. A second sensor 45 is disposed on the wing 2 such that said second sensor 45 detects a movement of the rudder 3 in relation to the wing 2.

The first sensor 25 and the second sensor 45 are connected to the controller 50 and to the computer unit 60 such as is shown in an exemplary manner in FIG. 2 and FIG. 3. It is thus made possible to monitor a connection and effect between the actuator 20 and the rudder 3, and to detect or determine, respectively, inconsistencies or deviations between the movement predefined by the actuator 20 and the movement actually carried out by the rudder 3.

A dedicated actuator which is assigned exclusively to one control surface is typically provided for each control surface in an airplane. In the context of the monitoring system described here, a dedicated sensor (the second sensor 45 described above) which detects the movement of each control surface is also provided for each control surface. For example, the movement of the control surface 3 in relation to the wing 2 or the fuselage 6 can be detected. With reference to the flap 4, the relative movement of the flap 4 in relation to the rudder can be detected. In principle, the relative movement of a rudder in relation to the associated stabilizer or the fuselage, and the relative movement of the flap in relation to the associated rudder, can be detected and compared with the anticipated movement. This enables play in the kinematic assembly which connects an actuator to the control surface assigned to said actuator to be identified and a corresponding message to be emitted such that further checking can be initiated according to requirements.

For reasons of redundancy, more than one sensor can be disposed on one control surface.

In addition, it is to be noted that "comprising" or "having" does not rule out any other elements or steps, and "a" or "an" does not rule out a multiplicity. Furthermore, it is to be noted that features or steps which have been described with reference to one of the above exemplary embodiments can also be used in combination with other features or steps of other above-described exemplary embodiments. Reference numerals in the claims are not to be considered restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Aircraft
2 Wing
3 Rudder
4 Flap
5 Vertical stabilizer
6 Fuselage
7 Horizontal stabilizer
10 Monitoring system
20 Actuator
22 Actuating element
23 Articulation
25 First sensor
30 Kinematics (levers, articulations, linkages)
33 Articulation, fulcrum
40 Controlled element
42 Fulcrum
45 Second sensor
50 Controller
60 Computer unit

The invention claimed is:

1. A monitoring system for monitoring a kinematic coupling between an actuator and a controlled element of an aircraft, wherein the monitoring system comprises:
    a first sensor disposed such that said first sensor is configured to detect an operative movement of the actuator and, based on the detected operative movement of the actuator, to provide a first signal;
    a second sensor disposed such that said second sensor is configured to detect a movement of the controlled element and, based on the detected movement of the controlled element, to provide a second signal;
    a computer unit connected to the first sensor and the second sensor and configured to receive the first signal and the second signal;
    wherein the computer unit, based on the first signal, is configured to determine an anticipated movement of the controlled element and to compare the anticipated movement with the detected movement corresponding to the second signal and to provide a deviation between the anticipated movement and the detected movement,
    wherein the computer unit is configured to carry out a task which is usually carried out by a dedicated testing apparatus at predefined maintenance intervals on ground, and to carry out the task during operation of the aircraft in the air;
    wherein the computer unit is configured to compare the anticipated movement with the detected movement, and determine a deviation between the anticipated movement and the detected movement; and
    wherein the computer unit is configured to output an indication when the deviation exceeds a threshold value.

2. The monitoring system according to claim 1, wherein the computer unit is configured to compare the deviation between the anticipated movement and the detected movement with a threshold value and to emit an error message when the deviation reaches or exceeds the threshold value.

3. The monitoring system according to claim 1, wherein the computer unit, based on a model of the kinematic coupling, is configured to determine the anticipated movement of the controlled element.

4. The monitoring system according to claim 1, wherein the first sensor as well as the second sensor are sensors selected from the group consisting of: a movement sensor, an angular rate sensor, a rotational position sensor, an angle sensor, a linear variable differential transformer, an optical sensor, a mechanical sensor having moving parts, a magnetic sensor, and a Hall effect sensor.

5. The monitoring system according to claim 1, wherein the second sensor is configured to detect the movement of the controlled element at a scanning rate of more than 1 kHz.

6. The monitoring system according to claim 1, wherein the computer unit is configured to supply the second signal to a filter and to use the filtered signal for the comparison with the first signal.

7. An aircraft, having a monitoring system according to claim 1.

8. The aircraft according to claim 7, wherein the controlled element is a control surface of the aircraft;
    wherein the actuator is an actuator connected to the control surface by way of a kinematic coupling.

9. The aircraft according to claim 8, wherein the second sensor is disposed so as to detect a relative movement between the control surface and a fuselage or any other component of the aircraft that is connected to the fuselage.

10. The aircraft according to claim 7, wherein the computer unit is configured to implement functions of the flight controls for the aircraft.

\* \* \* \* \*